No. 841,130. PATENTED JAN. 15, 1907.
C. DOLLINGER.
SPRING WHEEL.
APPLICATION FILED SEPT. 11, 1905.
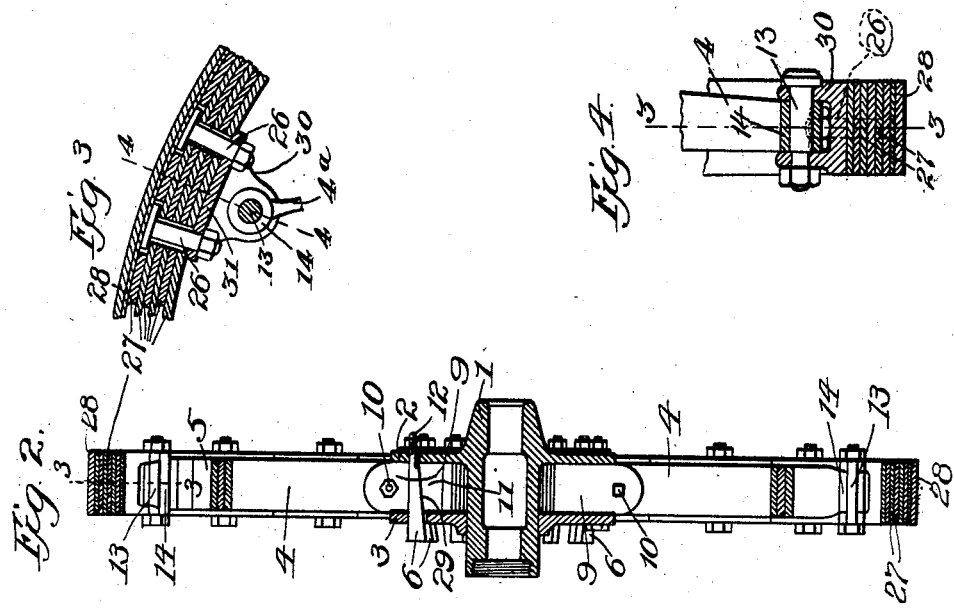
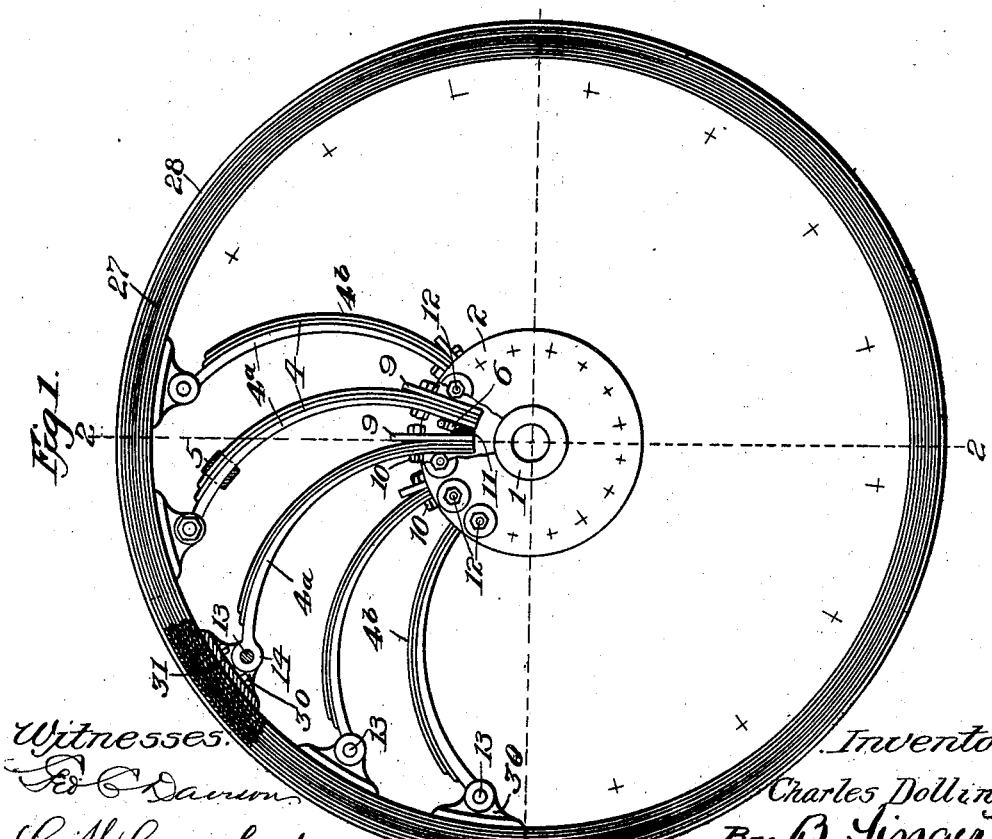
Witnesses:
Fed E. Davison
C. H. Crawford
Inventor.
Charles Dollinger,
By B. Singer.
Atty.

UNITED STATES PATENT OFFICE.

CHARLES DOLLINGER, OF BESZTERCZE-BANYA, AUSTRIA-HUNGARY, ASSIGNOR OF ONE-HALF TO BÉLA GÖLLNER, OF BESZTERCZE-BANYA, COMITAT ZÓLYOM, AUSTRIA-HUNGARY.

SPRING-WHEEL.

No. 841,130.   Specification of Letters Patent.   Patented Jan. 15, 1907.

Application filed September 11, 1905. Serial No. 278,018.

*To all whom it may concern:*

Be it known that I, CHARLES DOLLINGER, machine-engineer, a subject of the Emperor of Austria-Hungary, residing at Beszterc-Banya, Comitat Zolyom, in the Empire of Austria-Hungary, have invented certain new and useful Improvements in Spring-Wheels, of which the following is a full, clear, and exact description.

This invention relates to improvements in wheels of that class wherein the usual spokes are replaced by springs which connect the hub and rim and permit relative movement of one with respect to the other in order to neutralize the jar incident to travel upon rough roads.

The invention consists in an improved construction of the rim in cases where the wheel is used for heavy traffic and also to an improved hub with means for anchoring the springs thereto, and, further, to an improved construction of spring.

The invention will be more fully described in connection with the accompanying drawings and will be more particularly pointed out and ascertained in and by the appended claims.

In the drawings, Figure 1 is a side elevation, with parts broken away, of a wheel embodying the main features of my invention. Fig. 2 is a section on line 2 2 of Fig. 1. Fig. 3 is a section on line 3 3 of Fig. 4. Fig. 4 is a sectional view on line 4 4 of Fig. 3.

Like characters of reference designate similar parts throughout the different figures of the drawings.

An improved form of wheel according to my invention is shown, which is particularly adapted for heavy traffic, the rim consisting of a laminated construction 27. The laminated strips are of steel and constitute a rim adapted to withstand heavy loads and also serving to yieldingly support the loads. It will be obvious that where a construction of this kind is employed for lighter vehicles the number of laminated strips may be reduced according to requirements and uses to which the wheel is put. In order to render the wheel noiseless, the same is provided with a tread 28, of rubber, leather, or the like, which, as shown, consists of a flat strip equal in width to the laminated strips. The rim is connected to the hub 1 by a plurality of springs 4, said springs being anchored to the rim in the following manner: Blocks or fittings 30 are provided with parallel lugs apertured to receive bolts 13 and base portions 31, curved in a manner to lie flat upon the inner portion of the wheel-rim. The bases 31 are apertured to receive bolts 26, which extend upwardly in the laminated rim to or near the outermost strip 27, as shown in Fig. 3, said bolts being provided with relatively thin heads which overhang the innermost laminations, thereby securing the bolts in place. The inner ends of said bolts are provided with nuts, whereby the fittings may be detachably secured to the rim.

The springs 4 are preferably of laminated construction comprising a plurality of leaves 4ª, provided on their outer ends with enlargements 14, which fit closely between the lugs of the fittings 37 and which are secured in place by the bolts 13. In order to strengthen the main leaf 4ª and also to retain the necessary resiliency, the same is relatively thick near the enlargement 14 and tapers to a spring edge at its opposite end. The spring 4 are also provided with a plurality of reinforcing-leaves 4ᵇ, which extend from the hub outwardly to a point adjacent to the enlargement 14, each of said leaves 4ᵇ being preferably of uniform thickness. Said leaves 4ᵇ are secured at their outer ends to the leaves 4ª in any suitable manner, but preferably by metal clips 5, which completely surround the leaves and hold the same in close contact. Said leaves are secured at their inner ends by bolts 10, and there is provided a spacing or wedge plate 9 for each set of springs, said plates 9 being located beside the reinforcing-leaves of each set and extending from the bolt 10 to the innermost ends of said leaves. Said springs are preferably curved from their mounting at the tread to the hub in order to insure flexure in a single direction and are anchored at their inner ends to the hub 1 in the following manner: The hub 1 is provided with a central bore to receive the axle of the vehicle and with an outer annular flange 2, preferably integral with said hub. A removable flange 3 is provided which is screwed or otherwise rigidly mounted on the hub with a suitable intervening space for the reception of the ends of the springs 4, as clearly shown in Fig. 2. The springs 4 are adapted to be clamped in place between the flanges 2 and 3 in the present construction by a plurality of wedge-shaped bolts 6, provided with wedge-shaped or inclined portions 29. Said bolts 6 are provided with threaded ends 12, adapted to receive nuts which when turned down pull enlarged ends of the wedge 6 through complemental openings in the flange 3 to retain the parts in clamping relation. In order to prevent the inner ends of the springs 4 from being radially displaced from their clamping position when clamped in place, there is provided a plurality of wedge-blocks 11, located below the wedge-bolts 6 and adapted to be engaged thereby, said wedge-blocks being interposed between the spacing-plates 9 and the inner or main leaf $4^a$ of each set of springs, as clearly shown in Fig. 1. As the nut of the threaded end 12 is turned down and the bolt 6 tightened the inclined lower face of the bolt 6 forces the wedge-block 11 between the spacing-block and the leaf $4^a$ in a manner to securely hold the parts in place.

I claim—

1. An improved spring-wheel comprising a hub and tread, a plurality of springs yieldingly connecting the same, each spring including a main leaf pivotally connected to the tread and a plurality of reinforcing-leaves extending from the hub to a point adjacent to said pivotal connection, and a clip binding said leaf adjacent to said pivotal connection.

2. An improved spring-wheel comprising a laminated tread and a hub, springs secured to the hub, blocks mounted on said tread, and bolts extending through said blocks into the laminated tread, said springs having their outer ends pivotally secured to said blocks.

3. An improved spring-wheel comprising a laminated tread and a hub, springs secured to the hub, blocks mounted on said tread, and bolts extending through said blocks into the laminated tread, said springs having their outer ends secured to said blocks.

4. An improved spring-wheel comprising a plurality of springs, a hub provided with parallel flanges to receive the springs, and wedge bolts and blocks for holding said springs in position.

In testimony whereof I affix my signature in the presence of two witnesses.

CHARLES DOLLINGER.

Witnesses:
EDMOND MOHNÁR,
BÉNI GRÜNWALD.